(12) United States Patent
Hughes (10) Patent No.: US 7,278,059 B2
(45) Date of Patent: *Oct. 2, 2007

(54) METHOD FOR TESTING OPERATING SYSTEM COMPONENTS

(75) Inventor: Bryan William Hughes, Lynnwood, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/349,858

(22) Filed: Feb. 7, 2006

(65) Prior Publication Data

US 2006/0150025 A1    Jul. 6, 2006

Related U.S. Application Data

(63) Continuation of application No. 10/411,440, filed on Apr. 10, 2003, now Pat. No. 7,065,677.

(51) Int. Cl.
*G06F 11/00* (2006.01)
(52) U.S. Cl. .......................................... 714/38; 714/37
(58) Field of Classification Search .................. 714/37, 714/38, 33; 702/120, 123, 183; 717/124
See application file for complete search history.

(56) References Cited

U.S. PATENT DOCUMENTS

| | | | |
|---|---|---|---|
| 5,495,571 A | 2/1996 | Corrie et al. | |
| 5,513,315 A | 4/1996 | Tierney et al. | |
| 5,745,767 A * | 4/1998 | Rosen et al. | 717/124 |
| 5,754,755 A | 5/1998 | Smith | |
| 5,774,725 A | 6/1998 | Yadav et al. | |
| 6,067,639 A * | 5/2000 | Rodrigues et al. | 714/38 |
| 6,408,403 B1 | 6/2002 | Rodrigues et al. | |
| 6,557,120 B1 | 4/2003 | Nicholson et al. | |
| 6,577,982 B1 * | 6/2003 | Erb | 702/120 |
| 6,668,340 B1 * | 12/2003 | Baker et al. | 714/38 |

* cited by examiner

*Primary Examiner*—Gabriel Chu
*Assistant Examiner*—Tim Bonura
(74) *Attorney, Agent, or Firm*—Christensen O'Connor Johnson Kindness PLLC (57) ABSTRACT

A sequential operation system component (e.g., shell) testing method is disclosed that utilizes a set of established user applications to access particular components of an operating system. A set of components of the operating system to be tested are established. Capabilities of a set of applications to access the components is established. The manner in which applications access the components is analyzed to establish classes. Furthermore, parameter sets are identified for each of the classes (e.g., functions). Test cases are created based upon combinations of parameter usages. Test calls are formulated by defining actual values to the parameter usages defined for the test cases.

14 Claims, 4 Drawing Sheets

| Applications | Word XP | Corel WordPerfect | Word 6.0 |
|---|---|---|---|
| CLASS 1: Use ShellExecute | X | | |
| Parm: lpOperation | Test: Open, edit, print | | |
| Parm: lpFile | Test: Verfy file location | | |
| Param: lpParameters | Test: Parameter values passed correctly | | |
| Param: lpDirectory | Test: Pointer refers to directory being browsed | | |
| CLASS 2: Use ShellExecuteEx | | X | |
| Param: lpVerb | | Test: edit, explore, find, print, open | |
| Parm: lpOperation | | Test: Open, edit, print | |
| Parm: lpIDList | | Test: Value same as in lpFile | |
| Parm: lpFile | | Test: Verify file location | |
| Parm: lpParameters | | Test: Parameter values passed correctly | |
| Parm: lpDirectory | | Test: Pointer refers to directory being browsed | |
| CLASS 3: Use WinExec | | | X |
| Parm: lpCmdline | | | Test: Browes, explore, open |
| Param: uCmdShow | | | Test: Launches and displays per specification |

| Applications | FreeLance Graphics | PhotoShop |
|---|---|---|
| CLASS 4: Use GlobalAlloc | X | |
| Param: uFlags | Test: Ole, Clipboard | |
| Param: dwBytes | Test: Image creation and saving | |
| CLASS 5: Use HeapAlloc | | X |
| Param: hHeapAlloc | | Test: Validate returned handle to the heap |
| Param: dwFlags | | Test: Ole, Clipboard |
| Param: dwBytes | | Test: Image creation and saving |

METHOD FOR TESTING OPERATING SYSTEM COMPONENTS

CROSS-REFERENCE TO RELATED APPLICATION

This application is a continuation of U.S. patent application Ser. No. 10/411,440, filed Apr. 10, 2003, now U.S. Pat. No. 7,065,677 the benefit of the filing date of which is hereby claimed under 35 U.S.C. § 120, and which is fully incorporated herein by reference.

BACKGROUND

There exists a general need in the development of software/systems to ensure that the finished product is sufficiently tested prior to its release to the public. Such testing is performed to detect programming errors/flaws. Corrections are formulated and then incorporated into subsequent versions of the software. There are various levels of testing thoroughness. The more thorough software is tested prior to release of the software to users, the less likely bugs will be exposed in the subsequent use of the released software.

An application program interface of an operating system comprises a set of methods defining entry points by applications into the functionality (e.g., retrieving/opening files, launching executable programs, printing, etc.) supported/provided by the operating system. Furthermore, the functionality of the operating system comprises groups of related functions referred to herein as components. In the Microsoft Windows® operating system, examples of components include: bundled items such as Media Player and Shell (which includes multiple subcomponents such as Active Desktop, Address Bar, Common Dialogs, Control Panel, Desktop Folder, Explorer, File Association, etc.). Application program interface (API) testing ensures that operating system components (e.g., printing, shell, etc.), when called upon by application programs, execute in an intended manner. During API testing, an application program calls a set of methods included in the operating system API. The calls are modified during the course of testing to include various combinations of passed parameter values. The behavior of the called method is observed for each of the application calls.

API testing to ensure that an operating system will operate as intended, when properly performed, is both extensive and exhaustive. Such testing is extremely time consuming with regard to programming the calls to the API methods and with regard to the subsequent analysis of the operating system responses to the test calls. By way of example, API testing comprises submitting various combinations of values via an API to operating system components under test. In many, if not most, cases a large number of input parameters, and the many different potential values assignable to each of those input parameters discourages complete testing of the interaction between applications and the operating system program code via the API. As a result, previous methods for testing operating system components generally settled for less than complete coverage of the potential interactions between all application programs and the components of the operating system accessed through the operating system API.

One general technique for testing operating system components involves writing applications to directly call and test operating system components via their specified API methods. In such case, the application programs are written for the sole purpose of exercising the operating system component(s) under test. Such approach provides a high level of control over testing. By directly programming the calls themselves, a tester is able to tailor a test to include specific inputs to APIs under specific contexts. On the other hand, testing cannot be performed until the test program has been rendered.

Another general technique for testing an operating system API avoids the need to write a particular program to act as the caller to the components under test. This alternative approach involves running application programs and observing their operation (and errors/fault) with regard to the various called components of the operating system via the API. This approach avoids the need to author an application to submit calls to the operating system components. Furthermore, this approach ensures that at least the application used to perform the testing operates properly with regard to the particular operating system API. A potential shortcoming of this approach is the wide variety of applications that execute on an operating system and call upon its functionality through the API.

The above-described approaches to API testing, while offering particular advantages, also exhibit shortcomings including either an inability to exhaustively test an API or alternatively perform such exhaustive testing at a very high price in testing time and resources.

SUMMARY

The present invention seeks to address many of the shortcomings of the prior art with regard to testing components of an operating system. In accordance with the present invention, a method for testing a set of components of an operating system, via a set of application programs in accordance with a test definition, includes initially establishing a set of operating system components to be represented in the test definition. Examples of components include Shell, Multi-media, etc. Next, a set of capabilities are determined for a set of existing applications (e.g., user applications such as Word 7.0, Visio 2000, etc.). The capabilities include the calls issued by the applications during the course of their operation to one of the set of operating system components. The way in which the applications access the components (e.g., API functions/methods) are determined. The test definition is augmented to include a set of classes for components in accordance with various ways (e.g., distinct functions/methods) in which the application programs access the operating system components. Based upon the classes and components identified during previous steps, a set of test calls is formulated. The test calls correspond to the actual calls issued by the application programs in accordance with the capabilities defined during the second establishing step, the set of test calls covering the components and classes established during the first establishing and third establishing steps. It is noted that additional steps are potentially added to further enhance the test generation procedure. It is further noted that the actual submission of calls by the applications during a testing phase is also carried out in a variety of manners.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present invention embodies a new approach to testing interactions between applications and operating systems (e.g., compatibility, regression, etc.). A black box test methodology is incorporated wherein applications are utilized during testing to submit calls to various operating system components. Coverage of components during testing (e.g., compatibility between applications and an API) is established on a component-by-component (and in particular, a component class) basis. Complete coverage of a set of operating system components of interest is obtained using multiple applications, each application covering a portion of the set of component/class combinations comprising a complete set of interactions between applications and the set of components. Thus, rather than trying to cover all components potentially used by an application during testing, a set of applications are utilized during testing. Each application is enlisted to cover only particular component/classes of an operating system under test.

In the context of the present invention, a class is a set of similar or like interactions between programs and the APIs of the components they are calling and from which the applications receive responses. Examples of classes are particular functions or methods of an API. An item (or object) within the class is an application (e.g., Word 7.0, Excel 4.0, Access 2.0, PowerPoint 2.0, Visio 2000, etc.) that uses the particular function/method associated with the particular class. Each item within a class is substantially similar to the other items within the class with regard to its interaction with the component through the function/method associated with the class. Thus, only a single one of the items (e.g., applications) of the class need be used to cover testing a particular component/class combination.

By way of example, a shell component includes a behavioral/interaction Class Y1 comprising the ShellExecute function which is invoked by several different applications (items in the class). As the interactions of the applications with the ShellExecute function are all similar with regard to testing the functionality of the ShellExecute function of the shell component, any one of the applications (items) effectively represents Class Y1. The formation of a class and assigning items to the class bypasses testing all the applications in the Class Y1.

On the other hand applications may utilize a different function to achieve the same ends with regard to a particular operating system component—for example, ShellExecute for the shell component. Thus, a Class Y2 corresponds to applications calling the ShellExecute function for the shell component. Items (or objects) within the Class Y2 are applications that invoke the ShellExecute function.

The present invention potentially reduces the redundancies encountered during compatibility testing carried out through known testing schemes. Rather than attempting to test the full spectrum of interactions (component/class combinations) between an application and operating system components using a single test application, one uses multiple applications, wherein each application covers particular component/class combinations, to achieve coverage of the tested components. The test creation/execution method embodying the present invention encourages testing a full set of operating system components/classes by applications authored by multiple distinct vendors that potentially exercise the components in slightly differing ways, increasing the probability that programming flaws will be found during the testing.

The present approach encourages use of a variety of applications to test component sets. However, the individual applications perform only a fraction of the testing of a component set that is potentially covered by the functionality of the application—the aim is not to test the application's proper operation, but rather the operating system's proper operation through calls issued by the application. By way of a simple example (not addressing the potentially multiple classes of application/component interactions), to test 20 components, one can use 20 applications, and test one component with each application. The 20 applications are used to test 20 components, and (neglecting the time for loading an application) the 20 applications are tested in a time span similar to that of using one application to test 20 components. Thus, the present example maintains application coverage at substantially lower cost.

The present invention has a wide range of uses. Testing methods embodying the present invention can be used from beginning to advanced testing levels. At a beginning level, test calls through applications include: tests of dialogs and menus, for example, to test the commdlg.dll component; basic networking tests to hit a TCP/IP stack; tests of printing functions that hit appropriate printing dll's, etc. At more advanced levels, the method summarized herein is utilized to verify base level components and services, such as kernel32, NToskrnl, and DOSwow subsystems; inject faults; observe error handling on false value insertions into parameters; test boundaries, etc.

It is emphasized that the disclosed method is not a stand-alone methodology. The disclosed method does not replace application compatibility testing, which involves testing each application for functionality with a variety of components. Rather, this method is complimentary to standard application compatibility testing. Its purpose is to efficiently find flaws throughout the operating system with a less than completely exhaustive testing of the requirements of each one of a set of applications that utilize the operating system.

Figure 1:
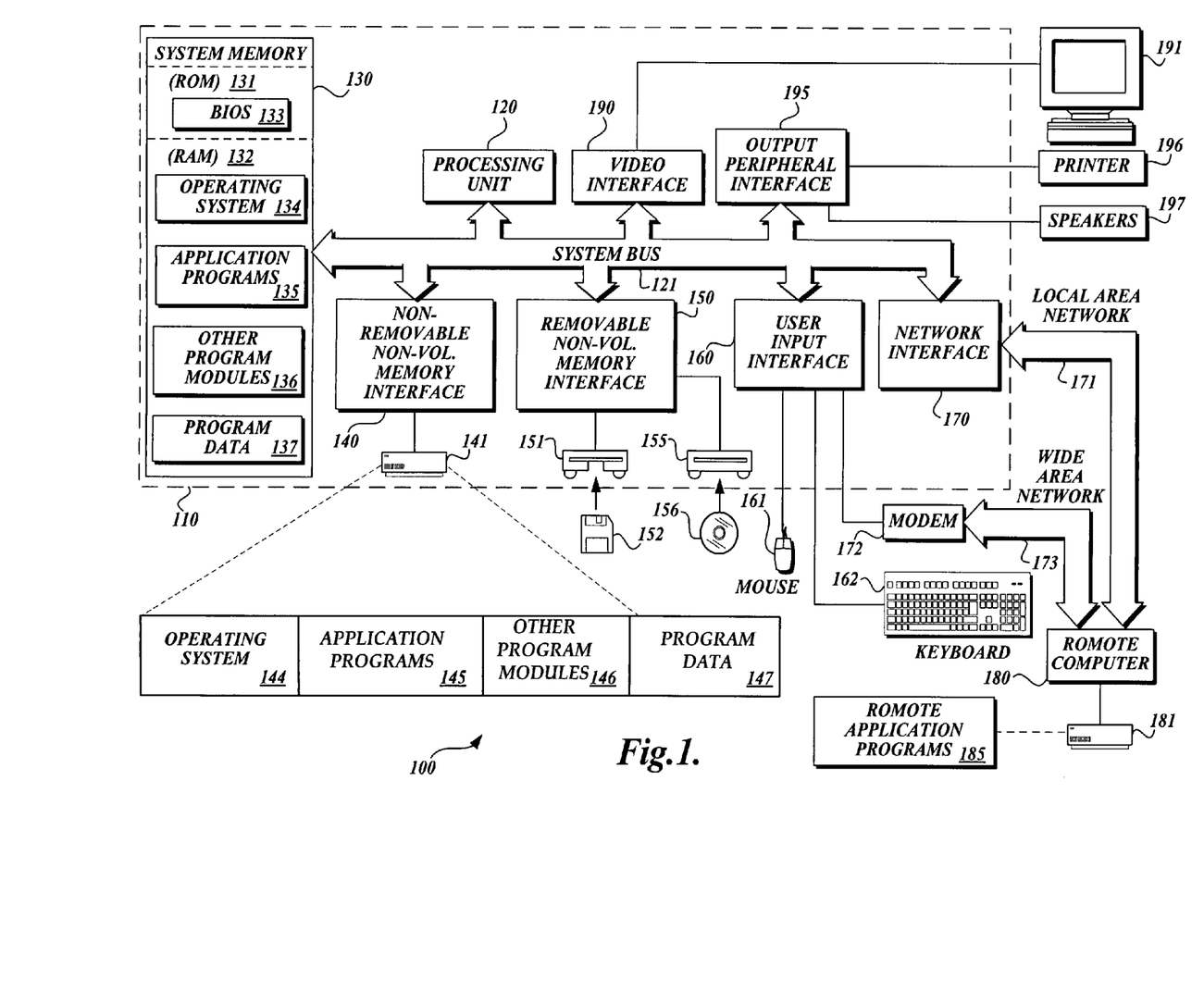
FIG. 1 is a block diagram depicting an exemplary computer system for carrying out portions of an embodiment of the invention.

Turning to the drawings, FIG. 1 illustratively depicts an example of a suitable operating environment 100 for carrying out portions of the operating system component testing method embodying the present invention. The operating environment 100 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, laptop/portable computing devices, hand-held computing devices, multiprocessor systems, microprocessor-based systems, network PCs, minicomputers, mainframe computers, distributed computing environments that include any of the above systems or devices, and the like.

The invention is described in the general context of a set of steps and processes carried out by computer-executable instructions, such as program modules, being executed by a computer. Generally, program modules include routines, programs, objects, components, data structures, etc., that perform particular tasks or implement particular abstract data types. Though the exemplary embodiment is described with reference to locally executed processes on a single computer system, the invention is potentially incorporated within network nodes operating in distributed computing environments where tasks are performed by remote processing devices that are linked through a communications network. In a distributed computing environment, program modules are generally located in both local and remote computer storage media including memory storage devices.

With continued reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Accelerated Graphics Port (AGP), Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is sometimes stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor 191, computers may also include other peripheral output devices such as speakers 197 and printer 196, which may be connected through an output peripheral interface 190.

The computer 110 potentially operates in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means for carrying out the described peripheral device driver management scheme may be used.

Figure 2:
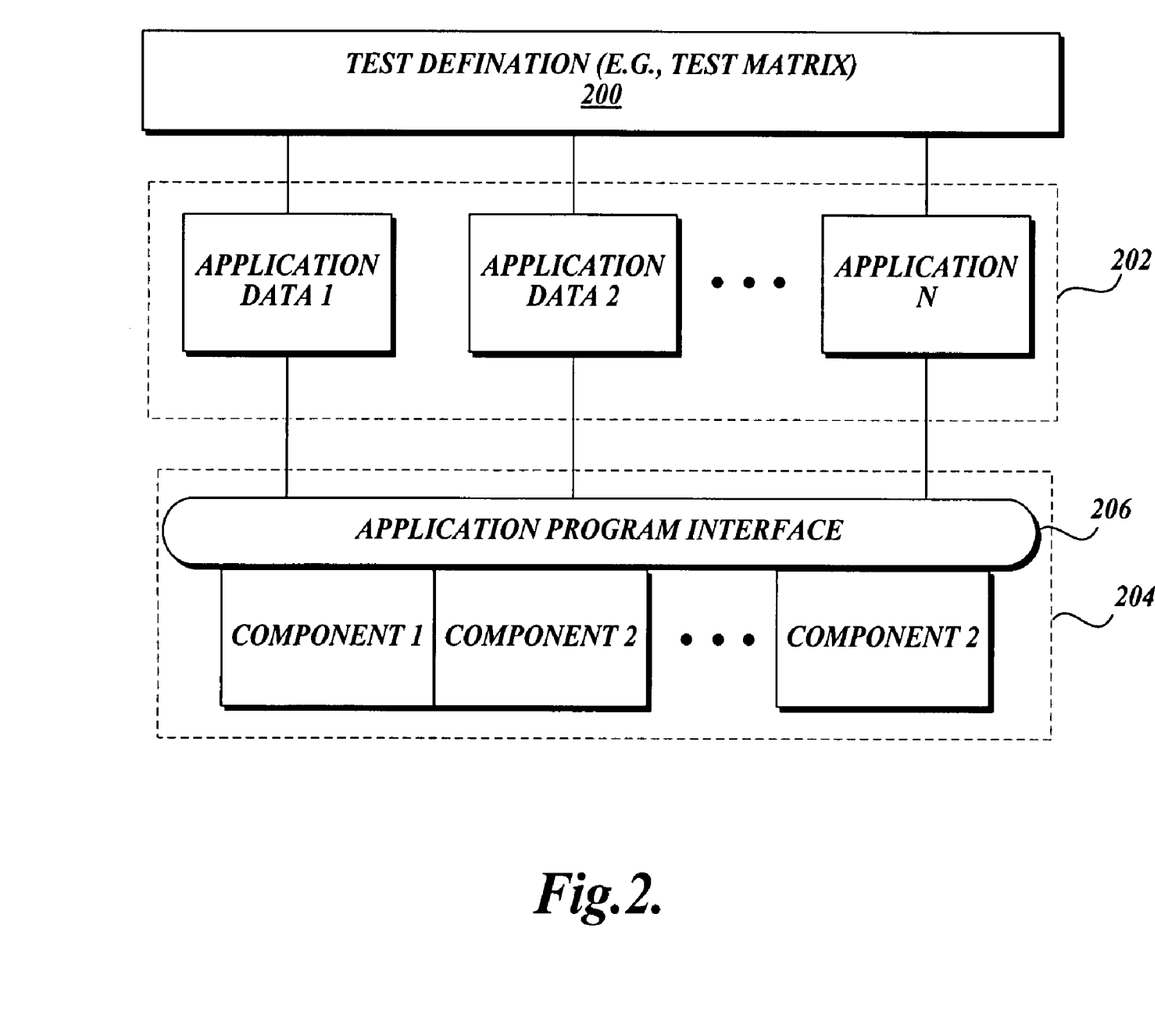
FIG. 2 is a high level schematic diagram depicting the general approach taken to carry out testing a set of operating system components, by an embodiment of the present invention, wherein a set of applications provide a conduit through which testing of the components occurs.

FIG. 2 illustratively depicts an exemplary component test formulation and execution arrangement embodying the approach, introduced above, that involves enlisting a well tested set of existing user applications to verify the proper operation of a set of operating system components. In accordance with an embodiment of the present invention, a test definition 200 enlists a set of well-tested applications (1-N) 202 to operate as the source of test calls to operating system components (1-M) of an operating system 204 via a defined API 206.

The test definition 200 drives the testing process. In particular, prior to performing the testing, the test definition 200 is formulated to provide a covering set of the operation system components of interest during the particular test. During the formulation of the test definition 200, a test definition structure, such as a matrix (see FIG. 3 described herein below) is created. The test definition 200 specifies particular ones of the applications (1-N) 202 to carry out testing of particular classes (e.g., functions, methods, etc.) within ones of the components (1-M) of the operating system 204 via the API 206.

Thereafter, during a test execution stage, the applications (1-N) 202 are sequentially loaded. After loading, each executes particular calls specified by the test definition 200 to test the particular class(es) of ones of the components (1-M) for which they have been designated as the test call source. Examples of the applications (1-N) 202 include ACDSee 4.01, Borland C++6.0, Office XP Professional, Photoshop, etc. Examples of types of components (1-M) include multimedia (DirectX, DirectPlay, etc.), networking (TCP\IP, Winsock, etc.), emulation layer (DOSWOW), Shell (Common Dialogs, Explorer, etc.), and Windows Media (Media Player, Movie Player, etc.)

It is noted that applications can access particular components (1-M) of the operating system 204 in different ways (e.g., through different functions/methods). For this reason, classes are established under each component to reflect the different ways that applications request services of the particular components (1-M) of the operating system 204.

Figure 3:
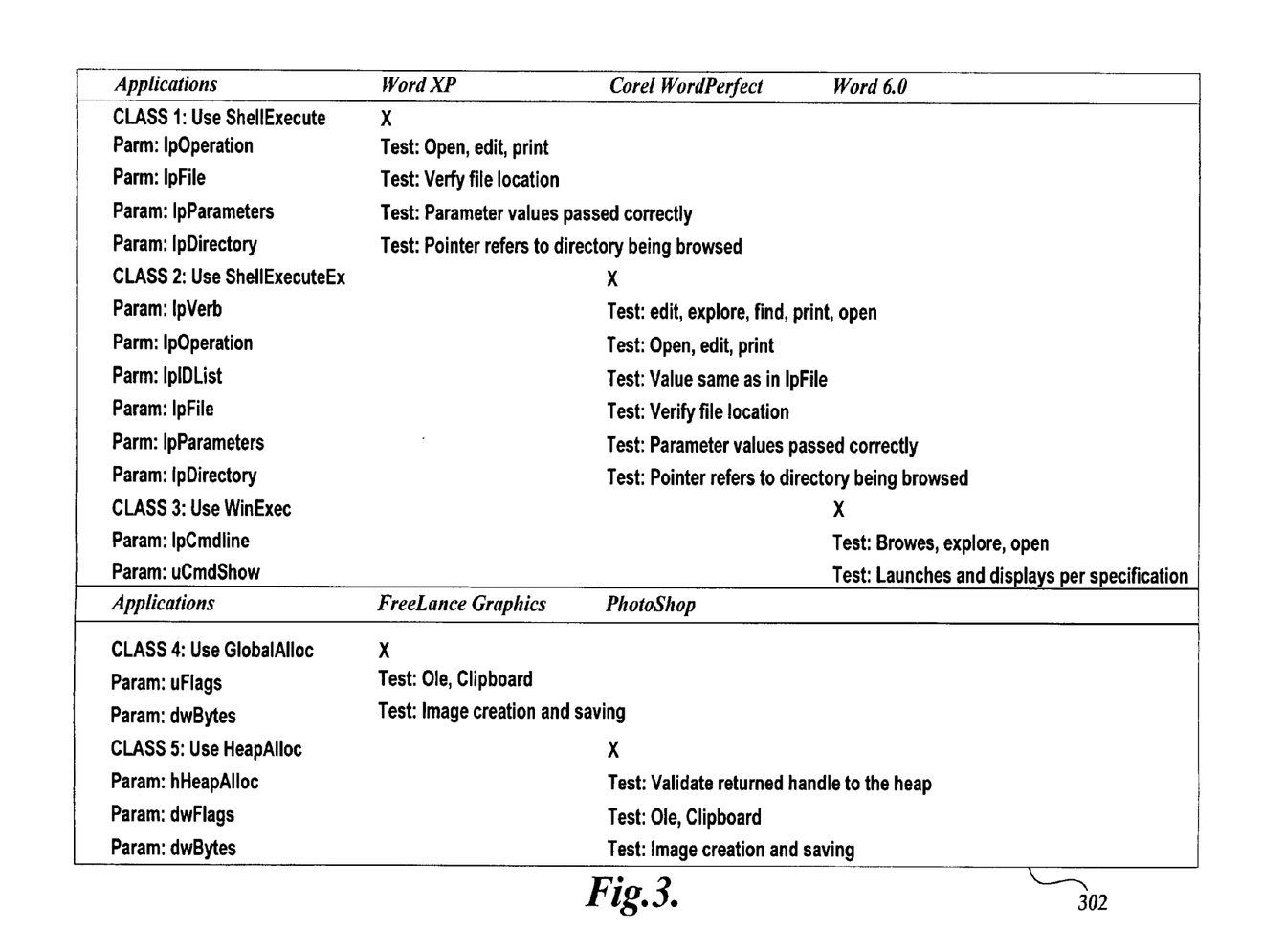
FIG. 3 is an exemplary test matrix (spreadsheet) depicting a set of operating system components that require testing and a set of applications selected to establish a covering set of tests for the components/classes of interest.

Turning to FIG. 3 a matrix is provided that depicts an exemplary test definition structure for carrying out the present invention. On one axis 300, a set of component/classes is listed. The set of component/classes defines the complete scope of the tested subject-matter. On a second axis 302 a set of applications is listed. Due to space constraints that prevent listing all the columns across the drawing sheet upon which FIG. 3 is presented, the test definition matrix is divided into two rows. The first row begins with the application "Word XP," and includes "Corel WordPerfect" and "WORD 6.0." The second row of the divided matrix begins with the application "Freelance Graphics" and includes the application "PhotoShop." The second row of the divided matrix is merely a continuation of the first row and does not reflect a different treatment of applications listed in the second row.

In the matrix provided in FIG. 3, a set of components to be tested includes: Shell and DOSWOW. The Shell component includes a class 1 corresponding to a ShellExecute function/method, a class 2 corresponding to a ShellExecute function/method, and a class 3 corresponding to a WinExec function/method. It is noted that the class 1 and class 2 differ by the inclusion, in class 2, of the "lpVerb" parameter in the call by the application to the shell component and its unique handling of the call based upon the additional parameter. The Emulation Layer (DOSWOW) component includes a class 4 corresponding to a GlobalAlloc function/method and a class 5 corresponding to a HeapAlloc function method. Under each class, a set of parameters is specified that are associated with each function/method call. In each parameter row of a tested class/function, tests are summarized for the identified parameter.

Figure 4:
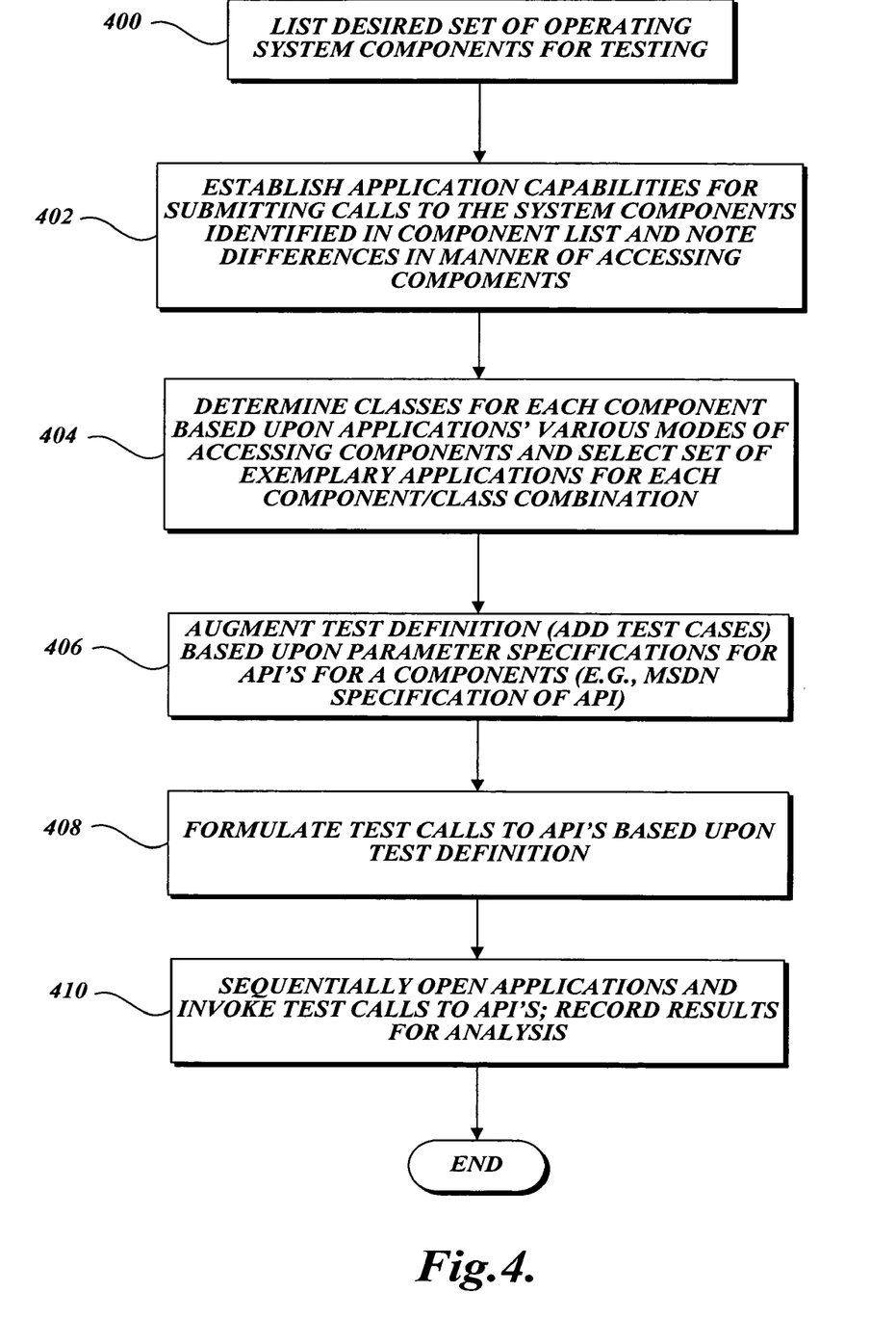
FIG. 4 is a flowchart depicting a set of steps summarizing a testing method embodying the present invention.

Turning to FIG. 4 a flowchart depicts a set of steps for defining a test case and then carrying out testing a set of operating system components and classes, representing particular ways of accessing the components in accordance with an embodiment of the present invention. Initially, at block 400, formulation of the test definition 200 commences by specifying the components of an operating system for which testing is desired.

At block 402, that may occur (entirely or in-part) either before or after block 400, the calls of a set of application executables/DLLs are observed to determine the capabilities of each with regard to acting as a source of calls to particular components of the operating system under test. In addition to noting the components called, differences with regard to how the components are accessed by the applications are also noted. In a particular embodiment of the invention a tool is utilized that views/records the methods/functions called by a particular executable or DLL.

Components of an operating system are accessed in a variety of ways. In many instances, differences in the way that the components are accessed cannot be disregarded during testing. Thus, in a particular embodiment of the invention, classes within components are identified by observing variations regarding the manner in which particular applications interface particular components of the operating system. In particular, during step 404 the information obtained during step 402 is utilized to establish classes under each component identified in the test definition 200 and fill in each listed component/class combination with a designated application that will carry out testing of the particular component/class. In an embodiment of the invention, at least one application is selected to provide test calls for each identified class for each component.

In accordance with an embodiment of the present invention, an attempt is made to reduce the redundancy of testing with regard to testing component/class combinations. Thus, after establishing component classes under each of the components, particular ones of the applications are selected to carry out testing of particular component/class combinations. Applications that access a component the same way are considered to fall within a same "equivalence group" with regard to that particular component/class—and thus comprise items within the class.

By way of example, approximate 80% of Windows applications call the well-known commdlg.dll operating system component. Variations with regard to how the commdlg.dll component is called and used are separated and defined as unique classes having a specifically defined component interaction behavioral model. Applications that call a same function/method to interact with the commdlg.dll component are grouped as items within a same class.

In an embodiment of the invention, redundant testing by applications within an equivalence group is avoided. Since applications within an equivalence group interact with a component in a same way, once a component/class is tested by one application within an equivalence group, the component/class need not be tested again by another application within the equivalence group. At block 404, one or two applications are selected from each equivalence group as the designated source for carrying out testing of the particular component/class combination. By narrowing down the list of applications that test particular component/class combinations, the quantity of calls included in a full test are reduced and greater effort can be focused upon analysis of a smaller set of test results.

At block 406, the matrix is supplemented based upon parameters specified for each class (function/method) previously identified at block 404. For each class (e.g., function/method) specified at block 404, a set of parameters is identified for a function/method call to an associated component. In the case of a Microsoft Windows® operating system component, the design specification of the function/method under test (specified by, for example, MSDN) is reviewed. Specific parameters of the function under test are examined, and test cases are designed for each relevant parameter.

As an example of identification of parameters specified at block 406, a test seeks to verify the proper operation of certain aspects of the shell component. One set of applications utilize the ShellExecute function/method class to ascertain the contents of the current directory and execute selected objects. The specification for the ShellExecute function is examined, by way of example, as described herein below to ascertain important test definition information such as the parameters and relevant values for verifying the proper operation of the ShellExecute function (class) of the Shell component.

Shell Execute Function
  Performs an operation on a specified file.
  Syntax

HINSTANCE ShellExecute (
  HWND hwnd,
  LPCTSTR lpOperation,
  LPCTSTR lpFile,
  LPCTSTR lpParameters,
  LPCTSTR lpDirectory,
  INT nShowCmd
);

Parameters
  hwnd
  [in] Handle to a parent window. This window receives any message boxes that an application produces, such as error reporting.
  lpOperation
  [in] Pointer to a null-terminated string, referred to in this case as a verb, that specifies the action to be performed. The set of available verbs depends on the particular file or folder. Generally, the actions available from an object's shortcut menu are available verbs. For more information about verbs and their availability, see Object Verbs. See Extending Shortcut Menus for further discussion of shortcut menus. The following verbs are commonly used.
  edit
  Launches an editor and opens the document for editing. If lIpFile is not a document file, the function will fail.
  explore
  Explores the folder specified by lpFile.
  find
  Initiates a search starting from the specified directory.
  open
  Opens the file specified by the lpFile parameter. The file can be an executable file, a document file, or a folder.
  print
  Prints the document file specified by lpFile. If lpFile is not a document file, the function will fail.
  NULL
  For systems prior to Microsoft® Windows® 2000, the default verb is used if it is valid and available in the registry. If not, the "open" verb is used.
  For Windows 2000 and later systems, the default verb is used if available. If not, the "open" verb is used. If neither verb is available, the system uses the first verb listed in the registry.
  lpFile
  [in] Pointer to a null-terminated string that specifies the file or object on which to execute the specified verb. To specify a Shell namespace object, pass the fully qualified parse name. Note that not all verbs are supported on all objects. For example, not all document types support the "print" verb.
  lpParameters
  [in] If the lpFile parameter specifies an executable file, lpParameters is a pointer to a null-terminated string that specifies the parameters to be passed to the application. The format of this string is determined by the verb that is to be invoked. If lpFile specifies a document file, lpParameters should be NULL.
  lpDirectory
  [in] Pointer to a null-terminated string that specifies the default directory.

Thus, at block 406, the test definition is updated to include, for each class (e.g., the ShellExecute function), the parameters associated with the class. Also at block 406, test cases are formulated based upon the parameters and their associated functions/roles in the call to the ShellExecute function. The following is a set of test cases appropriate for the ShellExecute function:
  Verify functionality in the IpOperation Parameter:
  TestCase: Open: Browse to another app from the app you are testing with, launch the app.
  TestCase: Open: Browse to a file from the app you are testing with. In this case, you could use explorer to browse to a 16-bit word file. Ensure that selecting a file type launches the associated application. TestCase(s):

Explore: Browse from 16-bit apps, dos and wow16, to other directories, across other drives, and across networks.

TestCase: Edit: Launch edit from appropriate applications. Ensure that edit opens, and is ready to edit. Enter and save some text.

TestCase: Print: Ensure that printing functionality is working properly, that the print dialog is called, launches and functions.

Verify functionality in the lpFile Parameter:

The file being acted on by lpOperation lives here.

TestCase(s): Hit this hard with funky file names, bad characters, etc. Example: Rename a file to be opened to some monstrosity with 395 characters and a bunch of special characters, supported and unsupported.

Verify functionality in the lpParameters Parameter:

If lpFile is an exe, passes parameters to be applied to the exe. If lpFile is a document, this should be Null TestCase(s): Attempt to open both exes, and to launch exes by specifying an associated file. Rename a document to an exe and see what dies.

Verify functionality in the lpDirectory Parameter:

This is where the default directory lives.

TestCase: Verify when you are searching for an app to launch that the search starts in whatever directory you are in.

TestCase: Verify File\Saves work, as well as File\Opens (when launching apps through both exes and associated file types).

These tests are added/linked into a test definition matrix (see, FIG. 3) under the class with which the function ShellExecute is associated. The tests are assigned to a particular item (application) to make the calls defined by the tests for the class.

With regard to the above-described classes, an example of different applications accessing an operating system component involves invoking different methods/functions to execute the same behavior/operation. Such differences are present in the code segments provided herein below for invoking the operating system to provide information from a particular file. One application may use the FileOpen function as follows:

Public Sub FileOpen(_
   ByVal FileNumber As Integer, _
   ByVal FileName As String, _
   ByVal Mode As OpenMode, _
   Optional ByVal Access As OpenAccess=
   OpenAccess.Default, _
   Optional ByVal Share As OpenShare=OpenShare.Default,
   _Optional ByVal RecordLength As Integer=-1_
)

While a second application might use the FileGet function to accomplish the same task:

Public Overloads Sub FileGet(_
   ByVal FileNumber As Integer, _
   ByRef Value As System.Array,
   Optional RecordNumber As Integer=-1, _
   Optional ArrayIsDynamic as Boolean=False _

Even though the apparent functionality is the same to the end user, because different functions are being invoked, both functions need to be tested, as well as the relevant parameters, in order to achieve complete test coverage. On the other hand, additional applications that utilize FileOpen (members of a same equivalence group) are eliminated from the test definition.

The test definition matrix represented in FIG. 3 depicts a test definition that identifies only one of multiple available applications to carry out testing of a particular class of a component. It is noted that in embodiments of the invention tests of a particular class are divided among a set of available applications. In such case, for the particular class (e.g., ShellExecute), the complete set of parameter tests within the class are allocated among multiple applications. Such further allocation is warranted in view of the many combinations of parameters that a function is potentially able to receive, and restrictions imposed by applications on the ranges of valid/accepted parameters (e.g., limits placed by the applications themselves on values passable to operating system components). Thus, to overcome restrictions placed by applications on acceptable parameters and to ensure satisfactory test coverage, more than one application is selectable to carry out testing of a particular class under a component listed in a test definition matrix.

Similarly, identifying equivalence classes occurs through a variety of sources. Such classes are exposed through known debugging tools and API viewers. In other instances the classes are determined through analysis of application source code. Alternatively, a program gathers information on the application\OS interface as manual testing is performed, and then the accumulated information is arranged into classes of component behavioral models of interfaces. Thereafter, software development and test engineers formulate application/component matrixes without the need to write additional scenarios or test cases. The application/component matrixes are passed down to beginning-intermediate level testers for manual or automated testing. Once a library of defined interaction classes for applications is populated, testers only need to access the library to design their own application testing harnesses based upon behavioral differentiation simply and effectively.

Once a library has been defined of specific application interactions, to develop a test matrix one selects appropriate applications to ensure that all components are tested that an array of classes (e.g., functions) for a particular operating system component are tested. For example, a tester wishes to test the "file\open" functionality of an operating system in the Beta development stage. A selection of applications is acquired, and each analyzed as to the method in which the file\open functionality is executed, using existing tools such as dependency walker and MSDN. In applications in which the functionality is executed in an identical fashion, the redundant applications are removed. Applications in which the functionality is executed in a different manner would remain, and thus a set would be selected from the larger list of applications based on applications executing this functionality in a differing manner.

At block 408, actual test calls are created that embody the selected test case entries in the test definition matrix established through the previously performed steps. The set of application calls is used as an interface to test the particular component/classes/cases included in the test definition matrix (including the test cases designed based upon the parameters of the particular function as defined by MSDN and added at block 406).

Finally, during testing at block 410, the calls provided by the test definition are issued, through the applications, to the components under test. The results are acquired and recorded for later analysis using any appropriate known debugging/development tools.

It will be appreciated by those skilled in the art that a new and useful method and system has been described for testing operating system components via a sequentially invoked set of applications that, in turn, exercise particular ones of the components in particular ways (i.e., classes). In view of the many possible environments to which the principles of this invention may be applied and the flexibility of designing and carrying out software utilities and tools, it should be recognized that the embodiments described herein are meant to be illustrative and should not be taken as limiting the scope of the invention. Those skilled in the art to which the present invention applies will appreciate that the illustrated embodiments can be modified in arrangement and detail without departing from the spirit of the invention. Therefore, the invention as described herein contemplates all such embodiments as may come within the scope of the following claims and equivalents thereof.

The embodiments of the invention in which an exclusive property or privilege is claimed are defined as follows:

1. A method for testing operating system components using a set of application programs in accordance with a test definition, the method comprising the steps of:
   (a) determining a set of operating system components to be represented in the test definition;
   (b) establishing a set of capabilities of each application program to issue requests to one of the set of operating system components, including for each request a way in which a particular one of the set of operating system components is accessed;
   (c) establishing a set of classes for the set of operating system components in accordance with various ways in which the set of application programs access the set of operating system components; and
   (d) formulating a set of test calls to be issued by the set of application programs in accordance with the capabilities of each application program, the set of test calls covering the set of operating system components and the set of classes for the set of operating system components established during the establishing steps.

2. The method of claim 1 further comprising the steps of:
   (a) opening the set of application programs; and
   (b) invoking by the set of application programs the set of test calls on the set of operating system components via an application program interface.

3. The method of claim 2 wherein the opening and invoking steps are performed sequentially with regard to the set of application programs.

4. The method of claim 2 further comprising the step of: logging a set of results arising from the invoking set of test calls.

5. The method of claim 1, wherein a class of the set of classes corresponds to a function.

6. The method of claim 5 further comprising the step of: identifying a set of parameters associated with a call to the function.

7. The method of claim 6 further comprising the step of: formulating test cases for the set of parameters.

8. The method of claim 6 wherein the function is an application program interface method.

9. The method of claim 1 wherein a class of the set of classes corresponds to an application program interface method.

10. The method of claim 1 further comprising the step of: establishing a set of test cases for a class.

11. The method of claim 1 wherein the set of operating system components are accessed by the set of applications programs via an application program interface.

12. The method of claim 1 further comprising the step of: selecting a single representative application program for each of the set of classes.

13. The method of claim 1 wherein the set of operating system components comprises an operating system shell component.

14. The method of claim 1 wherein the set of operating system components comprises an operating system sub-component.

* * * * *